United States Patent
Mezaael

(10) Patent No.: US 10,486,709 B1
(45) Date of Patent: Nov. 26, 2019

(54) VEHICLE DATA SNAPSHOT FOR FLEET

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/249,496

(22) Filed: Jan. 16, 2019

(51) Int. Cl.
- G07C 5/08 (2006.01)
- B60W 40/09 (2012.01)
- G07C 5/00 (2006.01)
- G08G 1/00 (2006.01)
- H04W 4/46 (2018.01)
- G06Q 40/08 (2012.01)

(52) U.S. Cl.
CPC ............. B60W 40/09 (2013.01); G06Q 40/08 (2013.01); G07C 5/008 (2013.01); G08G 1/22 (2013.01); H04W 4/46 (2018.02)

(58) Field of Classification Search
CPC .......... B60Q 9/00; H04W 4/44; H04W 4/021; B60R 1/00
See application file for complete search history.

(56) References Cited

U.S. PATENT DOCUMENTS

| | | | |
|---|---|---|---|
| 6,392,564 B1* | 5/2002 | Mackey | G08G 1/017 340/435 |
| 7,388,475 B2* | 6/2008 | Litkouhi | B60G 17/0195 340/425.5 |
| 7,460,940 B2* | 12/2008 | Larsson | A61B 3/113 180/272 |
| 8,140,358 B1 | 3/2012 | Ling et al. | |
| 8,354,932 B2* | 1/2013 | Schmitz | G01S 13/931 180/167 |
| 8,508,353 B2 | 8/2013 | Cook et al. | |
| 2012/0221216 A1* | 8/2012 | Chauncey | B60W 40/09 701/51 |
| 2015/0314783 A1* | 11/2015 | Nespolo | B60W 30/0953 701/301 |
| 2018/0001899 A1 | 1/2018 | Shenoy et al. | |
| 2018/0025636 A1* | 1/2018 | Boykin | G11B 27/102 701/1 |
| 2018/0225894 A1* | 8/2018 | Mays | G07C 5/008 |
| 2019/0193738 A1* | 6/2019 | Oh | B60W 30/18163 |

* cited by examiner

Primary Examiner — Munear T Akki
(74) Attorney, Agent, or Firm — Jennifer M. Stec; Brooks Kushman P.C.

(57) ABSTRACT

A vehicle includes a controller programmed to responsive to detecting a predefined driving event indicative of discrediting driving behavior, verify the driving event against a predefined scenario stored as a snapshot; responsive to failing to find a matching scenario, analyze the driving event using a predefined algorithm to verify whether the driving event is unintended; and responsive to verifying the driving event is unintended, save the driving event as a new snapshot.

16 Claims, 4 Drawing Sheets

VEHICLE DATA SNAPSHOT FOR FLEET

TECHNICAL FIELD

The present disclosure is generally related to a vehicle driving analysis system. More specifically, the present disclosure is related to system for analyzing driving events for a usage-based insurance (UBI) driver.

BACKGROUND

UBI is a type of vehicle insurance where by the premium cost is dependent on the driving behavior of a driver. An UBI device may be connected to a vehicle network via a connector such as an on-board diagnostic II (OBD-II) port to collect vehicle operating data and send the data to a remote server for analysis. Alternatively, a vehicle computer system may collect and report the operating data without using the UBI device. The vehicle operating data may be sent to the remote server/cloud via a subscription-based wireless network (e.g. a cellular network) which may be costly.

SUMMARY

In one or more illustrative embodiments of the present disclosure, a vehicle includes a controller programmed to responsive to detecting a predefined driving event indicative of discrediting driving behavior, verify the driving event against a predefined scenario stored as a snapshot; responsive to failing to find a matching scenario, analyze the driving event using a predefined algorithm to verify whether the driving event is unintended; and responsive to verifying the driving event is unintended, save the driving event as a new snapshot.

In one or more illustrative embodiments of the present disclosure, a portable device in communication with an in-vehicle network of a vehicle includes a processor, programmed to responsive to detecting a predefined driving event indicative of discrediting driving behavior via a sensor of the vehicle, verify the driving event against a predefined scenario stored as a snapshot; responsive to failing to find a matching scenario, analyze the driving event using predefined algorithm to verify if the driving event is unintended; and responsive to verifying the driving event is unintended, save the driving event as a new snapshot.

In one or more illustrative embodiments of the present disclosure, a method for a vehicle includes responsive to detecting a predefined driving event indicative of discrediting driving behavior via an electronic control unit, verifying the driving event against a predefined snapshot stored in a snapshot package; responsive to failing to find a matching snapshot, analyzing the driving event using predefined algorithm to verify if the driving event is unintended; and responsive to verifying the driving event is unintended, create a new snapshot for the driving event to add into the snapshot package.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes a vehicle driving event monitoring system. More specifically, the present disclosure proposes a driving event monitoring and analyzing system of drivers subscribed to or intends to subscribe to UBI services.

Figure 1:
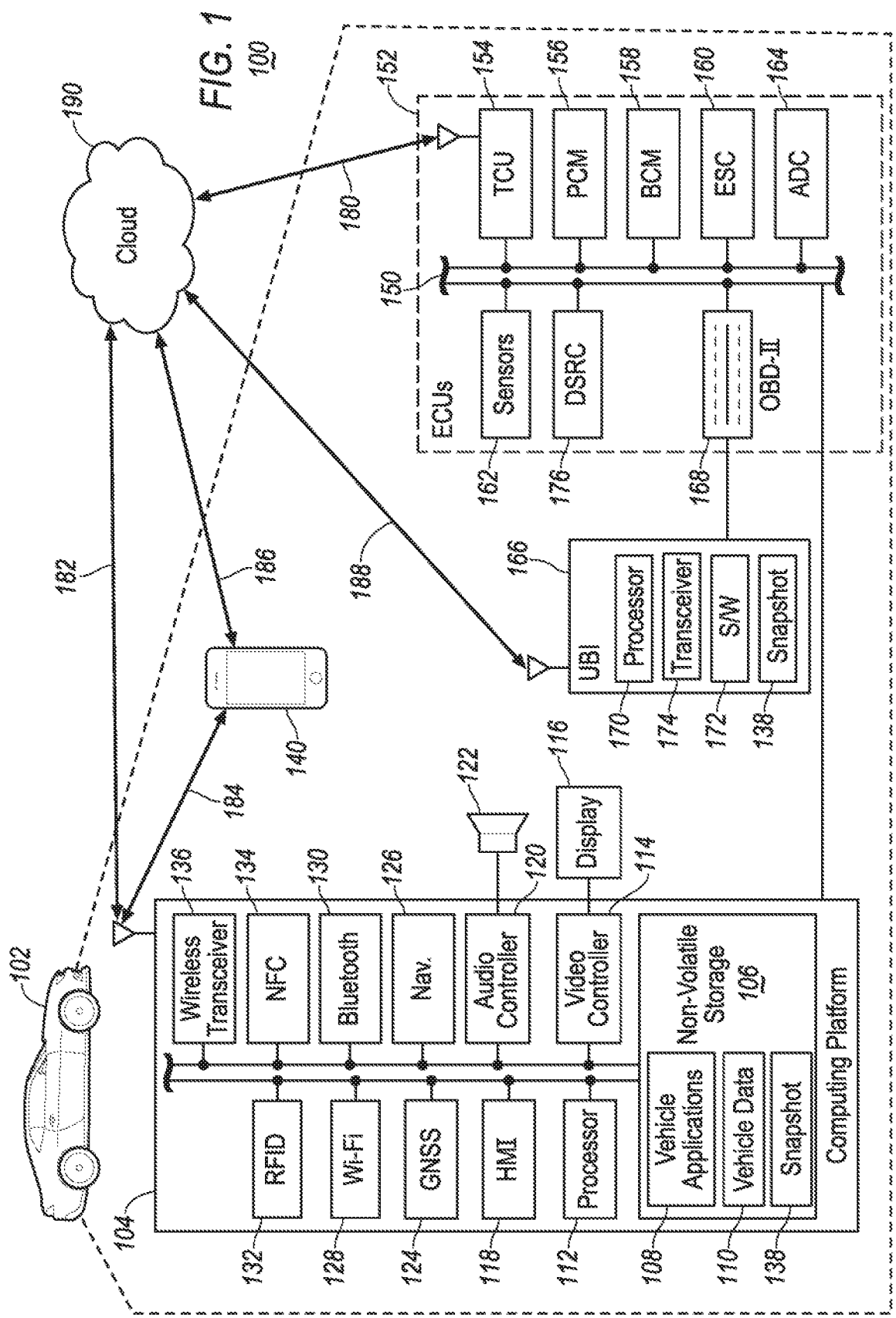
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, driving event analysis, event reporting, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 124 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110. Navigation software may be stored in the storage 106 e.g. as a part of the vehicle applications 108.

The computing platform 104 may be configured to wirelessly communicate with a mobile device 140 of the vehicle users/occupants via a wireless connection 184 through a wireless transceiver 136. The mobile device 140 may be any of various types of portable computing device, such as cellular phones, tablet computers, smart watches, laptop computers, portable music players, or other device capable of communication with the computing platform 104. The wireless transceiver 136 may be in communication with a Wi-Fi controller 128, a Bluetooth controller 130, a radio-frequency identification (RFID) controller 132, a near-field communication (NFC) controller 134, and other controllers such as a Zigbee transceiver, an IrDA transceiver (not shown), and configured to communicate with a compatible wireless transceiver (not shown) of the mobile device 140.

The computing platform 104 may be further configured to communicate various electronic control units (ECUs) 152 via one or more in-vehicle network 150. The in-vehicle network 150 may include, but is not limited to, one or more of a controller area network (CAN), an Ethernet network, and a media-oriented system transport (MOST), as some examples.

The ECUs 152 may include a telematics control unit (TCU) 154 configured to control telecommunication between vehicle 102 and a cloud 190 through a wireless connection 180 using a modem (not shown). Additionally or alternatively, the computing platform 104 may be configured to communicate with the cloud 190 via the mobile device 140 through a wireless connection 186. The computing platform 104 may be further configured to directly communicate with the cloud 190 via the wireless transceiver 136 using compatible protocols through a wireless connection 182. The cloud 190 may include one or more servers, or computers connected via various types of wired or wireless networks. It is noted that the term cloud is used as a general term throughout the present disclosure and may refer to any cloud-based services involving multiple servers, computers, devices and the like.

The ECUs 152 may further include a powertrain control module (PCM) 156 configured to monitor and control the powertrain operation of the vehicle 102. For instance, the PCM 156 may be configured to the stop/start of an engine (not shown), and/or the driving mode (e.g. economic, normal, or sport) of the vehicle 102. The ECUs 152 may further include a body control module (BCM) 156 configured to monitor and control body operations of the vehicle 102. For instance, the BCM 156 may be configured to control and monitor body functions such as door lock/unlock, seatbelt warning, vehicle occupancy, blind spot monitoring or the like using signals detected via one or more sensors 162. The sensors 162 may include any electronic, mechanical, magnetic, optical sensors or the like configured to communicate with various ECUs 152 to provide sensing signals. As a few non-limiting examples, the sensors 162 may include a gravitational sensor (g-sensor) configured to measure a gravitational force such as acceleration, deceleration and cornering, a seatbelt latch sensor configured to detect seatbelt fasten status, a vehicle speed sensor configured to measure vehicle speed, a vehicle proximity sensor configured to measure a distance between the vehicle 102 and an object, a camera sensor configured to take image or video outside or inside the vehicle 102, one or more temperature sensors configured to measure an ambient and/or cabin temperature of the vehicle 102, and a vehicle fuel level sensor configured to measure fuel level of the vehicle 102.

The ECUs 152 may further include an electronic stability controls (ESC) 160 configured to monitor vehicle operation status using signals from the speed sensor 162 and control the stability of the vehicle operation whenever needed such as by activating anti-lock brakes (ABS), traction controls or the like. The ECUs 152 may further include an autonomous driving controller (ADC) 164 configured to monitor and control the autonomous driving features of the vehicle 102. Some autonomous driving feature may include lane keep assist, safe distance from other vehicles, cruise control, hands-off-wheel alert, autobraking, brake mitigation with multiple sensitivity levels or the like. The ECUs 152 may further include a dedicated short-range communication (DSRC) controller 166 configured to wirelessly communicate with compatible controllers of other vehicles or digital entities (not shown).

The vehicle 102 may be further provided with a UBI device 166 connected to the in-vehicle network 150 via a connecting port such as an OBD-II connector 168 configured to communicate with various ECUs 152 of the vehicle 102 and collect data therefrom. The UBI device 166 may be provided with a processor 170 configured to execute commands and instructions of software 172 to perform various operations including analyzing data received from the in-vehicle network 150. The UBI device 166 may be further provided with wireless communication capability via a wireless transceiver 174 configured to communicate with the cloud via a wireless connection 188. The utilization of the UBI device 166 may be optional and the same function or operations may be performed by the computing platform 104 with software as one of the vehicle applications 108 without having the UBI device 166 connected to the in-vehicle network 150.

Figure 2:
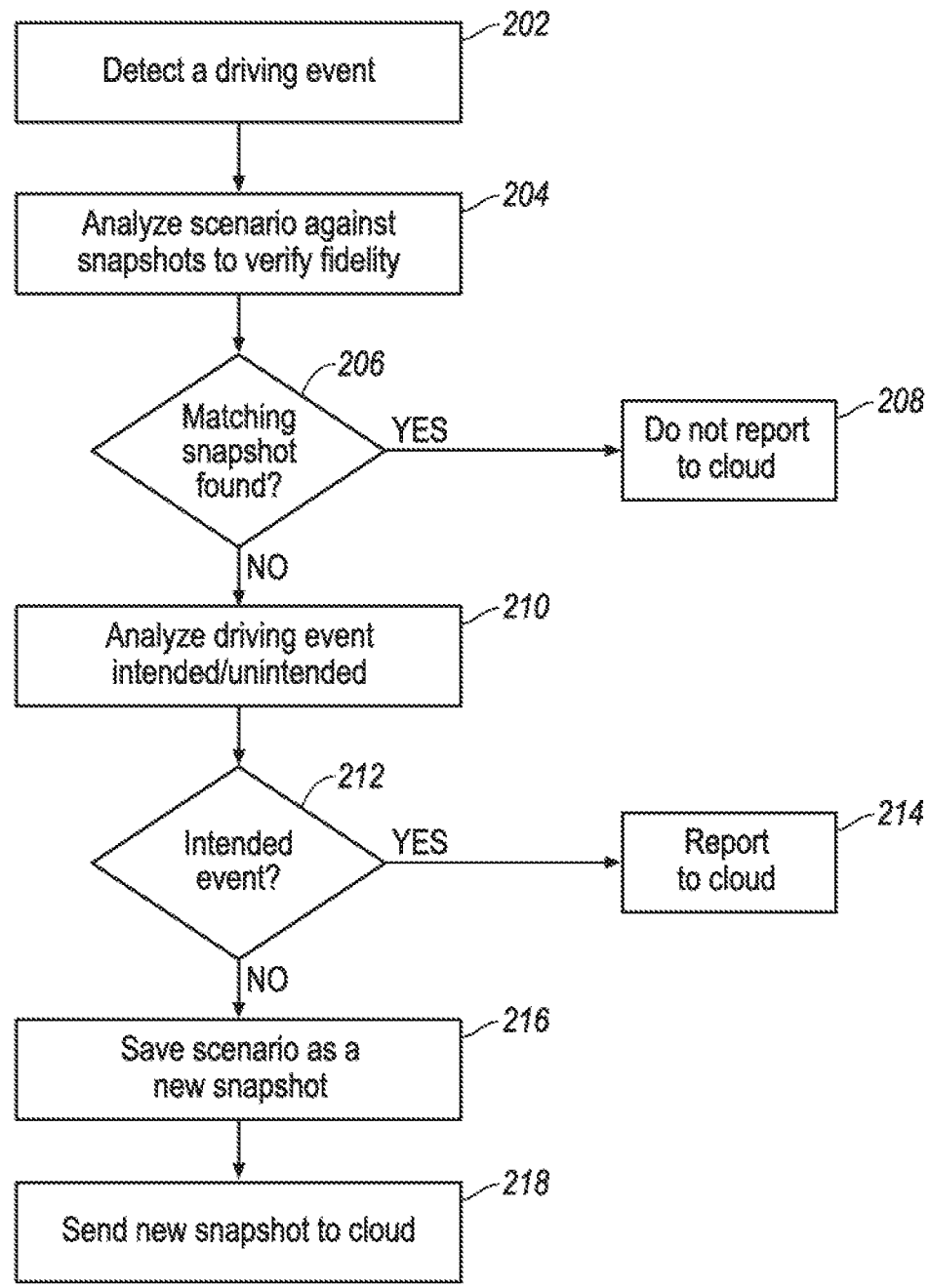
FIG. 2 illustrates an example flow diagram for a process of one embodiment of the present disclosure.

Referring to FIG. 2, an example flow diagram for a process 200 of one embodiment of the present disclosure is illustrated. With continuing reference to FIG. 1, the process 200 will be described as implemented by the computing platform 104 as an example. However, the process 200 is not limited to the implementation via the computing platform 104 and may be implemented on the UBI device 166 as well as other components of the vehicle 102 (e.g. the mobile device 140). At operation 202, the computing platform 104 detects a predefined driving event via a sensor 162 and/or an ECU 152. The driving event may be any event that the insurance provider is interested in to determine how well the driver operates the vehicle 102. As a few non-limiting examples, the driving event may include a hard-braking event in which the deceleration detected via the g-sensor 162 exceeds a predefined threshold. Additionally or alternatively, the hard-braking event may be detected via the ESC controller 160, e.g., engaging ABS controls. The driving event may further include a hard-acceleration event in which the acceleration detected by the g-sensor 162 and/or other ECUs 152 (e.g., PCM 156 detecting high RPM) exceeds a predefined threshold. The driving event may further include a harsh cornering event in which the cornering of the vehicle 102 detected via the g-sensor 162 and/or a ECU 152 (e.g., the ESC 160) exceeds a predefined threshold. The driving event may further include an excessive speed event e.g. driving above the speed limit by 10 mph, detected via a speed sensor 162, the GNSS 124 and/or the navigation controller 126. The driving event may further include a lane changing without signal event detected by the camera 162 and/or the BCM 158. The driving event may further include an excessive idling event detected via the sensors 162 and/or the PCM 156.

Responsive to detecting the predefined driving event, at operation 204, the computing platform 104 analyzes the scenario/pattern data collected from various sensors 162 and/or ECUs 152 against snapshots 138 stored in the storage 106 to verify the fidelity of the driving event i.e. to determine if there is a matching scenario for the driving event. In case that process 200 is implemented via the UBI device 166, the snapshot may be stored locally on the UBI device 166. Alternatively, the UBI device 166 may have limited storage space and be configured to use the storage 106 to store, read and write the snapshot 138. A snapshot 138 may include a scenario for one or more driving event to determine if the driving event detected suggests bad driving behavior of the driver. The bad driving behavior may include any driving behavior that may be potential used by the insurance provider to discredit a subscriber and increase his/her premium. For instance, a snapshot 138 may include a predefined scenario in which the vehicle 102 keeps a predefined safe distance behind the vehicle in front, and a hard-braking of the vehicle 102 is caused by the sudden deceleration of the front vehicle. The computing platform 104 verifies the event fidelity by checking the detected scenario against similar scenarios stored as the snapshots 138 to determine of the detected driving event is an event across multiple hard braking scenarios. If a matching scenario is found, the hard braking performed by the driver of the vehicle 102 does not suggest any bad driving behavior and therefore the current driving event should not be reported to the cloud 190 associated with the insurance company. Responsive to finding a matching snapshot at operation 206, the process proceeds to operation 208 and the computing platform 104 does not report the driving event detected to the cloud 190. Otherwise, the process proceeds to operation 210.

At operation 210, the computing platform 104 analyzes scenario data to determine if the driving event detected is an intended event or an unintended event. The snapshots 138 stored in the storage 106 may include many scenarios for various driving event. However, the snapshots 138 may not be exhaustive to include all unintended driving events. For instance, a driving event may be verified to be unintended if the computing platform 104 detects the driving event occurs to avoid an equally risky or riskier situation. Various artificial intelligence (AI) algorithms stored as applications 108 may be used by the computing platform 104 to make such verifications. As a few non-limiting examples, the AI algorithms may include decision trees, clustering, and/or neural network algorithms.

Following the above hard braking event for instance, the hard-braking of the vehicle 102 may be caused by an unexpected vehicle cutting into the lane in which the vehicle 102 is driving and the driving of the vehicle 102 performed the hard-braking only to avoid and accident. This scenario may not be included in any snapshots 138 pre-configured by the vehicle manufacturer. However, after analyzing the data detected by the camera 162 and/or proximity sensors 162, the computing platform 104 may determine that hard braking event is not intended by the driver of the vehicle 102 and therefore such driving event does not suggest a bad driving behavior. The process 200 proceeds from operation 212 to operation 216. If, however, at operation 212 the computing platform 104 detects there is no unintended cause for the driving event, the process 200 proceeds to operation 214 to report the driving event to the cloud via the TCU 154.

Responsive to detecting the driving event to be unintended, the computing platform 104 saves the scenario of the driving event as a new snapshot 138 in the storage 106 at operation 216. The new snapshot 138 may be used to verify the fidelity of future driving event at operation 204. At operation 218, the computing platform 104 sends the new snapshot 138 to the cloud 190 to share the snapshot 138 with other fleet vehicles.

Figure 3:
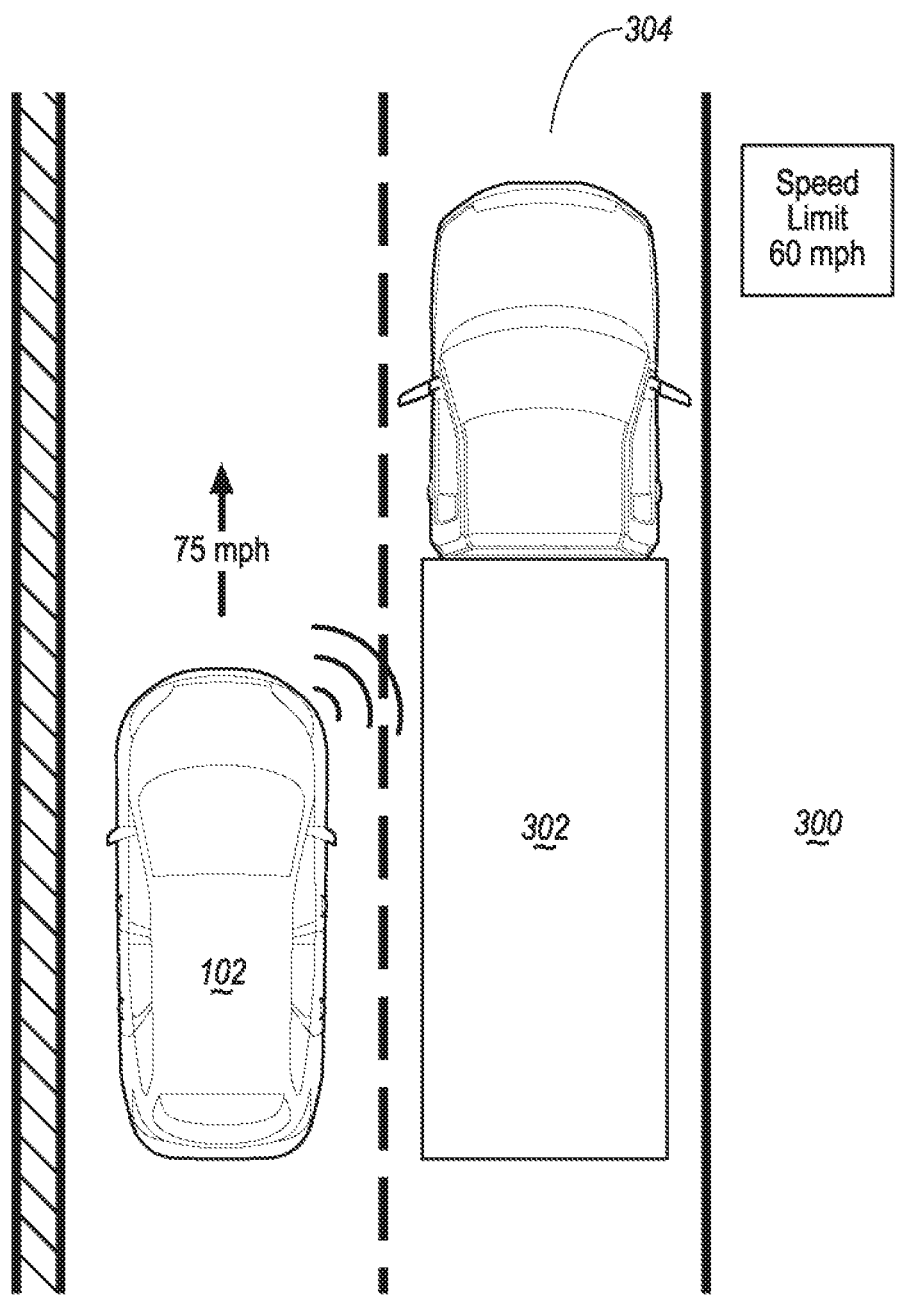
FIG. 3 illustrates an example diagram of the vehicle system of one embodiment of the present disclosure.

The operations of the process 200 may be applied to various situations. For instance, referring to FIG. 3, an example diagram 300 for an application of the vehicle system of one embodiment of the present disclosure is illustrated. In the present example, the computing platform 104 of the vehicle 102 may detect an excessive speeding event via a vehicle speed sensor 162. For illustrative purposes of the present example, the speed limit for the road 304 on which the vehicle 102 is travelling is 60 miles per hour (mph) and the vehicle 102 is travelling at a higher rate of speed of 75 mph, which is 15 mph above the legal speed limit—suggesting a bad driving behavior under normal circumstances. The driver of the vehicle 102 may speed up above the speed limit only to pass a semi-truck 302 to avoid driving parallel to the semi-truck 302 which may be an unsafe thing to do. The computing platform 104 may detect the presence of the semi-truck 302 to the right of the vehicle 102 via a proximity sensor 162. The entire scenario of the driving event captured by the computing platform 104 may be the vehicle 102 speeds up while there is an object close to the right side the vehicle 102, and the vehicle 102 reduces to normal speed after passing the object. After comparing the driving event against existing snapshot, no matching scenario may be found. Next the computing platform 104 analyzes the scenario to detect if the driving event is intended or unintended. The analysis may be performed using software stored in the storage 106 as one of the vehicle applications 108. The computing platform 104 may analyze the intent of the driving event by determining if it will be equally risky or riskier for the vehicle 102 without performing the driving event i.e. excessive speeding in the present example. The analysis may result in a determination that the driving event is unintended to avoid a hazard condition which is driving too close to the semi-truck 302. In this case, the computing platform 104 may save the scenario as a new snapshot in the storage 106. The computing platform 104 may be further configured to send the new snapshot to the cloud 190 to share with other fleet vehicles.

In another example, the computing platform 104 may detect an excessive idling event (e.g., the vehicle 102 has stopped but keeps idling for more than 10 minutes) via the PCM 156 which suggests a bad driving behavior. The excessive idling may be beyond the driver's control as the vehicle 102 is waiting at a customs/border along with other vehicles. The computing platform 104 may detect there are vehicle both before and behind the vehicle 102 via cameras and sensors 162. In addition, the computing platform 104 may detect the vehicle is located within a predefined geofence associated with long waiting lines (e.g. a border crossing). In this case, the computing platform 104 may be configured not to report the excessive idling event.

Figure 4:
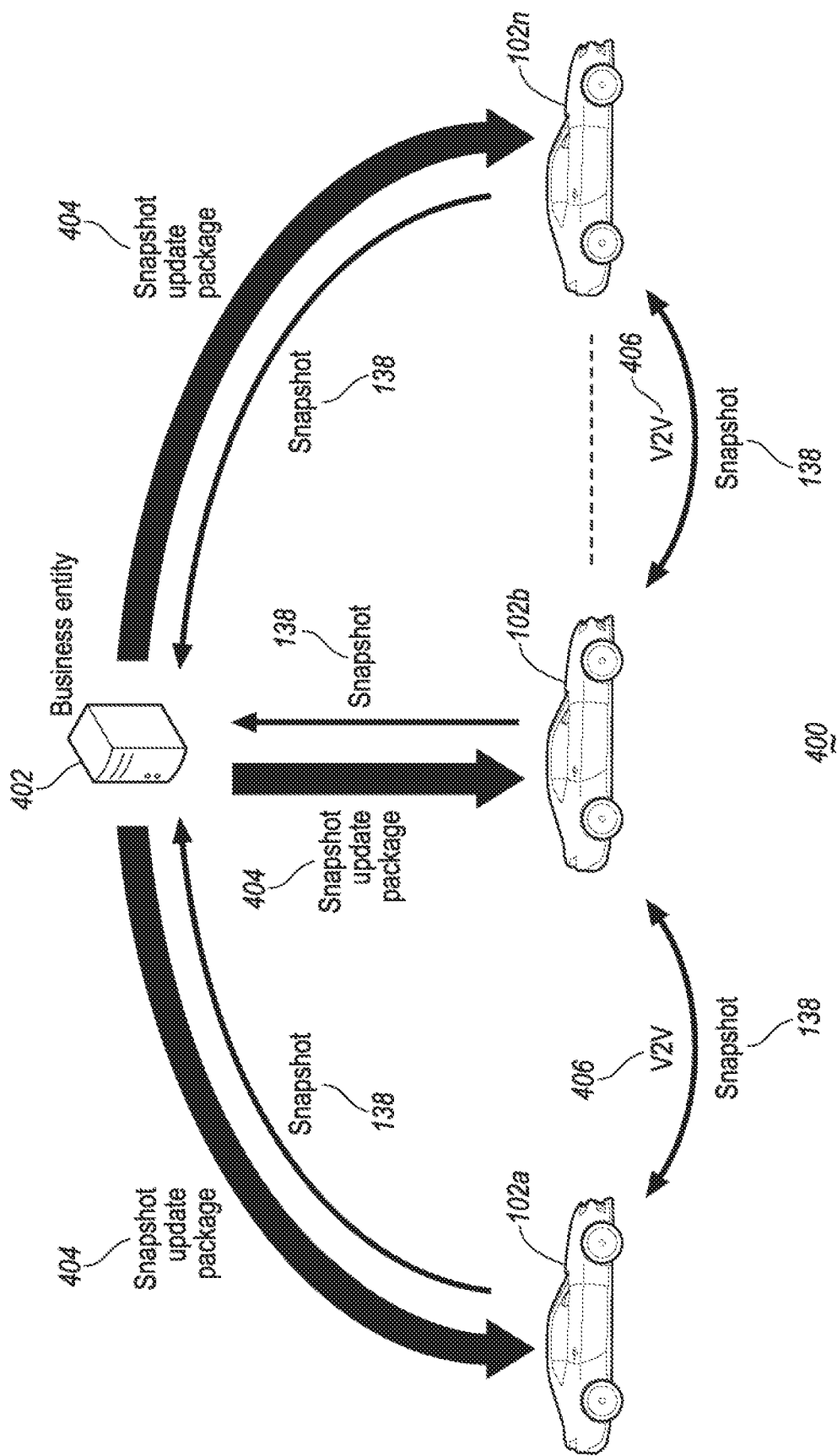
FIG. 4 illustrates an example system diagram of one embodiment of the present disclosure.

Referring to FIG. 4, an example diagram of the vehicle snapshot sharing/subscription network system of one embodiment of the present disclosure is illustrated. Multiple fleet vehicles 102a, 102b . . . 102n are subscribed to the UBI vehicle driving event snapshot system via the computing platform or the UBI device 166. The fleet vehicles 102a, 102b . . . 102n may send newly generated snapshots 138 to a business entity 402 to report new scenarios not yet included in existing snapshot packages. The business entity 402 may be any entity designated to manage the UBI subscription and/or snapshot package distribution. For instance, the business entity 402 may be the insurance provider or a fleet manager. Responsive to receiving the snapshots from the fleet vehicles 102a, 102b . . . 102n, the business entity may perform further analysis to those snapshots to update snapshot packages to validate if those scenarios included in the snapshots are intended or unintended. The analysis may be performed with or without human involvement. The business entity 402 may periodically publish snapshot update packages 404 to send to each subscribing vehicle to update the existing snapshot package 138 stored in each vehicle. The snapshot update package distribution 404 may be universally performed to any fleet vehicles 102a, 102b . . . 102n via the cloud 190. Alternatively, the snapshot update package may be sold/subscribed to individually and only distributed to those fleet vehicles individually subscribed to the relevant package.

The fleet vehicles 102a, 102b . . . 102n may be further configured to share snapshots 138 with each other via vehicle-to-vehicle (V2V) connections 406 using various wireless communication technologies such as RFID, NFC, Wi-Fi, Bluetooth and/or DSRC technologies. The snapshots shared among the fleet vehicles 102a, 102b . . . 102n may include snapshot update packages 404 distributed by the business entity, and/or new snapshots generated by each fleet vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle subscribed to a usage-based insurance (UBI), comprising:
 a controller, programmed to
  responsive to detecting a predefined driving event indicative of discrediting driving behavior, check the driving event against a predefined scenario stored as a snapshot to verify a fidelity of the driving event;
  responsive to the fidelity of the driving event indicative of failing to find a matching scenario, analyze the driving event using a predefined algorithm to verify whether the driving event is unintended;
  responsive to verifying the driving event is not unintended, report the driving event to a server;
  responsive to verifying the driving event is unintended, save the driving event as a new snapshot; and
  send the new snapshot to a fleet vehicle subscribed to the UBI via a wireless transceiver of the vehicle through vehicle-to-vehicle (V2V) connection.

2. The vehicle of claim 1, wherein the controller is further programmed to send the new snapshot to a cloud via a telematics control unit (TCU) to share the detected driving event.

3. The vehicle of claim 1, wherein the controller is further programmed to, responsive to receiving a snapshot package update, update the snapshot.

4. The vehicle of claim 1, wherein the driving event includes at least one of: a hard-braking event, a hard-acceleration event, a harsh cornering event, an excessive speed event, a lane changing without signal event, or an excessive idling event.

5. The vehicle of claim 1, wherein the V2V connection is established between the vehicle and the fleet vehicle using at least one of the following technologies: radio-frequency identification (RFID), near-field communication (NFC), Wi-Fi, Bluetooth and/or dedicated short-range communication (DSRC).

6. A portable device, in communication with an in-vehicle network of a vehicle, comprising:
 a processor, programmed to
  responsive to detecting a predefined driving event indicative of discrediting driving behavior via a sensor of the vehicle, check the driving event against a predefined scenario stored as a snapshot to verify a fidelity of the driving event;

responsive to the fidelity of the driving event indicative of failing to find a matching scenario, analyze the driving event using predefined algorithm to verify if the driving event is unintended;

responsive to verifying the driving event is not unintended, report the driving event to a server;

responsive to verifying the driving event is unintended, save the driving event as a new snapshot; and send the new snapshot to a fleet vehicle subscribed to usage-based insurance (UBI) via a wireless transceiver of the vehicle through vehicle-to-vehicle (V2V) connection.

7. The portable device of claim 6, wherein the processor is further programmed to send the new snapshot to a cloud via a wireless transceiver of the portable device to share the detected driving event.

8. The portable device of claim 6, wherein the processor is further programmed to receive a snapshot package update from a cloud via a TCU of the vehicle to update the snapshot.

9. The portable device of claim 6, wherein the portable device is connected to the in-vehicle network of the vehicle via an on-board diagnostic II (OBD-II) port.

10. The portable device of claim 6, wherein the driving event includes at least one of: hard-braking event, a hard-acceleration event, a harsh cornering event, an excessive speed event, a lane changing without signal event, or an excessive idling event.

11. The portable device of claim 6, wherein the V2V connection is established between the vehicle and the fleet vehicle using at least one of the following technologies: RFID, NFC, Wi-Fi, Bluetooth and/or DSRC.

12. A method for a vehicle, comprising:

responsive to detecting a predefined driving event indicative of discrediting driving behavior via an electronic control unit, checking the driving event against a predefined snapshot stored in a snapshot package to verify a fidelity of the driving event;

responsive to the fidelity of the driving event indicative of failing to find a matching snapshot, analyzing the driving event using predefined algorithm to verify if the driving event is unintended;

responsive to verifying the driving event is not unintended, report the driving event to a server;

responsive to verifying the driving event is unintended, create a new snapshot for the driving event to add into the snapshot package; and send the new snapshot to a fleet vehicle subscribed to usage-based insurance (UBI) via a wireless transceiver of the vehicle through vehicle-to-vehicle (V2V) connection.

13. The method of claim 12, further comprising:

sending the new snapshot to a cloud via a TCU to share the driving event.

14. The method of claim 12, further comprising:

responsive to receiving a snapshot package update, updating the snapshot package.

15. The method of claim 12, further comprising:

receiving a generated snapshot from a fleet vehicle via a V2V connection.

16. The method of claim 15, wherein the V2V connection is established between the vehicle and the fleet vehicle using at least one of the following technologies: RFID, NFC, Wi-Fi, Bluetooth and/or DSRC.

* * * * *